United States Patent [19]

VonGrünberg et al.

[11] Patent Number: 4,537,289

[45] Date of Patent: Aug. 27, 1985

[54] DUST BOOT FOR A DISC-BRAKE ACTUATING CYLINDER-AND-PISTON UNIT

[75] Inventors: Hubertus VonGrünberg, Bloomfield Hills; Jonathan M. Rowell, Birmingham; Frederick C. Corey, Dearborn, all of Mich.

[73] Assignee: International Telephone and Telegraph Corporation, New York, N.Y.

[21] Appl. No.: 389,739

[22] Filed: Jun. 18, 1982

[51] Int. Cl.³ .................. F16D 65/00; F16J 15/52
[52] U.S. Cl. .................. 188/97.4; 188/264 G; 92/168; 74/18.2
[58] Field of Search .................. 188/72.4, 72.5, 71.6, 188/370, 73.31, 73.33, 73.1, 250 G, 250 B, 264 G; 74/18.2; 92/168, 165 R, 248

[56] References Cited

U.S. PATENT DOCUMENTS

| | | | |
|---|---|---|---|
| 3,378,116 | 4/1968 | Henning | 188/250 B |
| 3,497,038 | 2/1970 | Schrader et al. | 188/370 |
| 4,270,442 | 5/1981 | Bainard et al. | 188/72.4 |
| 4,313,527 | 2/1982 | Pickel | 188/73.1 |
| 4,327,925 | 5/1982 | Alexander et al. | 74/18.2 |
| 4,335,806 | 6/1982 | Lupertz | 188/73.33 |
| 4,373,615 | 2/1983 | Melinat | 188/250 B |
| 4,401,012 | 8/1983 | Emmett | 188/264 G |
| 4,431,090 | 2/1984 | Kinoshita | 188/264 G |

FOREIGN PATENT DOCUMENTS

| | | | |
|---|---|---|---|
| 1286845 | 1/1969 | Fed. Rep. of Germany | 188/73.31 |
| 2028932 | 3/1980 | United Kingdom | 188/370 |

Primary Examiner—Bruce H. Stoner, Jr.
Assistant Examiner—Alvin Oberley
Attorney, Agent, or Firm—James B. Raden

[57] ABSTRACT

A sealing element for a cylinder-and-piston unit, especially a dust boot of a disc-brake actuating unit, includes an annular deformable portion of an elastically deformable material, and an annular connecting portion of a resilient material which is permanently sealingly connected to the inner region of the deformable portion and mounts the same on a protruding annular portion of the piston which extends out of the cylinder, by clampingly engaging such protruding portion. The connecting portion is substantially U-shaped in axial section and includes an outer ring, an inner ring and an interconnecting web extending between the outer and inner rings. The inner ring converges in the direction of introduction thereof into the annular protruding portion of the piston and carries oppositely and outwardly oriented lugs which engage behind an internal bead of the protruding portion of the piston. A brake shoe has a clip with several prongs which engage behind the inner ring of the connecting portion. The inner region of the deformable portion may have a zone which is squeezed between the outer ring of the connecting portion of the sealing element and the external surface of the protruding portion of the piston to frictionally engage the latter. The deformable portion has an outer region which is reinforced by a ring and is retained in a recess of the cylinder, and an intermediate region shaped to form undulations at least in the retracted position of the piston.

1 Claim, 2 Drawing Figures

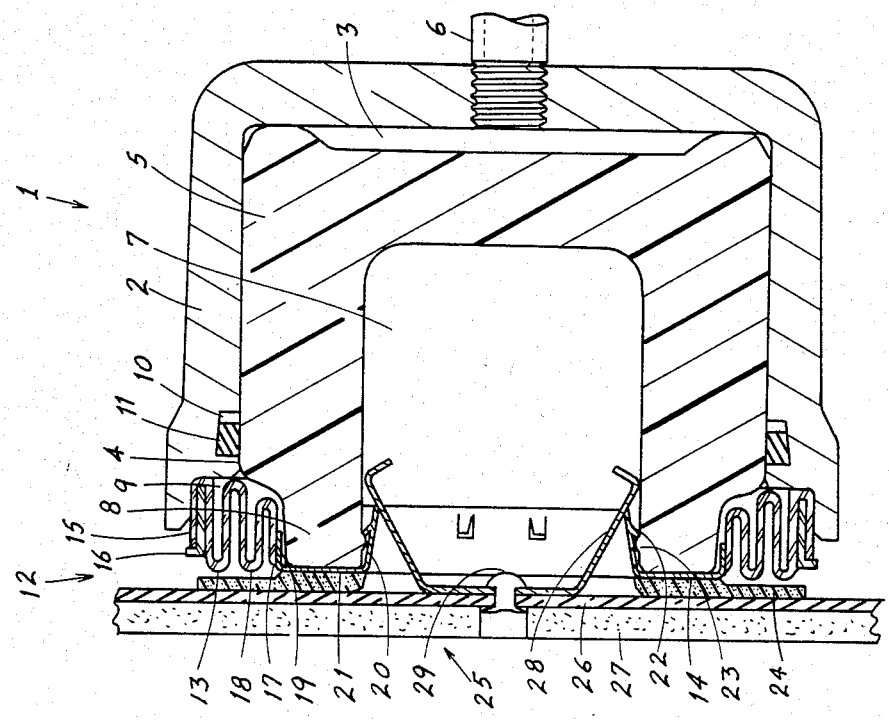
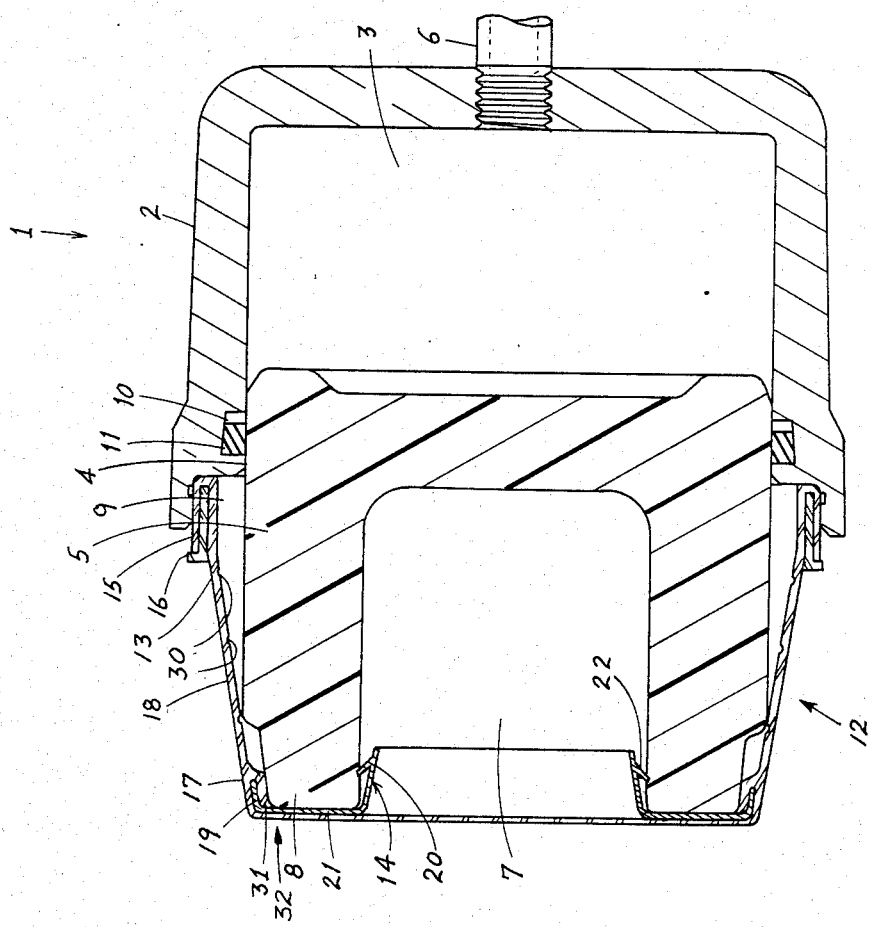

4,537,289

DUST BOOT FOR A DISC-BRAKE ACTUATING CYLINDER-AND-PISTON UNIT

BACKGROUND OF THE INVENTION

The present invention generally relates to sealing elements for use in preventing contaminants from reaching the interface between a cylinder housing and a piston slidably received in the housing, and more particularly to a dust boot for use on a brake shoe actuating piston of a vehicular brake, especially a disc brake.

Disc brakes are finding steadily increasing use in motor vehicles, such as in passenger cars, because of their relative simplicity and high reliability even under adverse conditions. The most frequently used disc brake construction is of the so-called spot type, in which a pair of brake shoes is mounted at the opposite axial sides of a brake disc which rotates with the respective wheel axle or wheel, the brake shoes extending only over a part of the trajectory of movement of the respective axial end faces of the disc which are to be engaged by the friction linings of the brake shoes during the braking operation. The brake shoes are so mounted on respective supports that they cannot be entrained by the brake disc for orbiting about the brake disc support, but that they are able to move toward and away from the respective disc end faces for frictional engagement therewith and for disengagement therefrom, respectively.

The supports for the brake shoe may include either a separate stationary support portion for each of the brake shoes, or a stationary support carrier member for one of the brake shoes and a caliper member mounted on the carrier member for sliding axially of the brake disc for the other brake shoe. However, both brake shoes can also be axially slidably mounted either on the caliper member alone, or between the caliper member and the carrier member.

In each instance, a preferably hydraulically operated actuating cylinder-and-piston unit incorporated in the vehicle braking system is usually used for moving the respective brake shoe at least toward the respective end surface of the brake disc in response to pressure increase in the braking system during the braking operation. Each of the brake shoes may be operated by its own cylinder-and-piston unit, or a common cylinder-and-piston unit may be used for simultaneously operating both brake shoes, in which case the piston directly acts on one of the brake shoes, while the caliper transmits the force acting on the cylinder of the common cylinder-and-piston unit to the other brake shoe.

Regardless of which approach is taken, the respective cylinder-and-piston unit is disposed at a highly contaminated region, that is, at the region of the wheel and brake disc where dust particles and other solid or liquid contaminants, possibly lifted from the roadway by rotating wheels, are abundant. It is imperative that such contaminants be prevented from penetration into the interface between the outer circumferential surface of the piston and the inner circumferential surface of the cylinder housing which bounds the bore in which the piston is sealingly and slidably received, since the presence especially of solid contaminants in this interface would at least interfere with the proper operation of the cylinder-and-piston unit if not eventually lead to its destruction. This is why so-called dust boots are usually installed between the cylinder housing and the piston of the brake actuating cylinder-and-piston unit, especially where the bore of the cylinder housing is open in direction toward the adjacent brake shoe to permit the piston to partially emerge from the bore at least during the braking operation, and often on a permenent basis.

In one conventional construction of the cylinder-and-piston unit equipped with a dust boot, the piston is provided, on a portion thereof which is permanently situated outwardly of the bore of the cylinder housing, with a circumferentially extending outer groove which receives an inner bead of a generally bellows-shaped or undulating sealing element, while the outer region of the sealing element is provided with a reinforcing ring to obtain a tubular configuration and is press-fitted into a corresponding enlarged portion of the bore of the cylinder. In this construction, the outer groove is indispensable in order to achieve proper sealing action at this region and, possibly even more importantly, to prevent the inner region of the sealing element from slipping off the projecting end portion of the piston. It will be appreciated that the need for providing the outer groove significantly complicates the manufacture of the piston, especially when the latter is produced by using otherwise relatively inexpensive manufacturing techniques, such as die casting or injection molding, since it usually entails and additional machining operation.

On the other hand, it is also known to provide a piston of synthetic plastic material which has an annular end portion protruding out of the bore of the cylinder when assembled therewith to form a cylinder-and-piston unit with an annular cap which embraces the annular end portion and protects the same from damage due either to mechanical, chemical, or thermal influences. Such a protective cap may be substantially U-shaped in axial section and may be provided with various projections or the like which either frictionally engage the piston or dig into its material to retain the protective cap on the annular end portion of the piston. However, the conventional protective caps do not eliminate the need for the provision of the above-discussed outer groove for the inner bead of the dust boot. Moreover, since such a conventional protective cap is usually in direct or mediate contact with the brake shoe, it contributes to the generation of noises during the braking operation as the brake shoe vibrates. To eliminate this drawback, it has been proposed to interpose a shim of elastomeric material between the protective cap and the piston. However, this solution leaves much to be desired, particularly since it involves the use of an additional element in the assembly and thus an additional asembling step.

Moreover, recent trend in the vehicle equipment and accessory industries was toward reducing the weight of the various components without sacrificing or impairing their functional reliability. Thus, instead of using a solid piston and a connecting rod connecting the piston to the brake shoe, it has been proposed to use a hollow piston, and to connect the brake shoe to the piston by a resilient clip having at least one portion which is retained in an internal circumferentially extending groove of the hollow piston. Obviously, this calls for an additional machining operation since it is very difficult if not impossible to make such internal groove during the die-casting or injection-molding operation. Also, inasmuch as this internal groove has to have a substantial depth in order to achieve secure retention of the clip therein, the wall thickness of the circumferential wall of the piston has to be accordingly increased beyond what would be needed if no such inner groove were provided.

SUMMARY OF THE INVENTION

Accordingly, it is a general object of the present invention to avoid the disadvantages of the prior art.

More particularly, it is an object of the invention to provide a sealing element, especially a dust boot for a brake-shoe actuating cylinder-and-piston unit of a disc brake, which does not possess the disadvantages of the conventional sealing elements of this type.

Still another object of the present invention is to so construct the sealing element of the type here under consideration as to achieve secure retention of the inner region thereof on the protruding annular end portion of a hollow piston without the need for providing any outer groove on the piston.

It is yet another object of the present invention so to design the sealing element as to reduce noise and heat transmission without requiring the provision of any additional components.

A concomitant object of the invention is to develop an assembly of a brake shoe with the associated actuating cylinder-and-piston unit in which there is no need for providing any inner groove in the hollow piston for the retention of the connecting clip.

An additional object of the present invention is to devise an assembly of the above kind and a sealing element therefor which are simple in construction, inexpensive to manufacture, and reliable in operation nevertheless.

In pursuance of these objects and others which will become apparent hereafter, one feature of the present invention resides in a sealing element, especially a disc brake dust boot, for use in preventing environmental contaminants from reaching the interface between a cylinder bounding a bore and a piston slidably received in the bore and having an annular end portion permanently protruding from the bore, which sealing element comprises an annular deformable portion of elastically deformable material having an outer region sealingly engaging the cylinder in use and an inner region; and an annular connecting portion of resilient material permanently sealingly connected to the inner region of the deformable portion and having a substantially U-shaped configuration in axial section to embrace and clampingly engage the protruding annular end portion of the piston in use. A particular advantage of this construction is that the connecting portion, which is of unitary construction with the deformable portion, securely holds the sealing element on the protruding end portion of the piston, without requiring the provision of any outer groove in the piston.

Advantageously, the connecting portion has an outer and an inner ring and a web interconnecting the rings. One of the rings may be so dimensioned as to frictionally retain the connecting portion on the protruding annular end portion of the piston in use.

The inner region of the deformable portion advantageously extends over at least a portion of the inner surface of the outer ring of the connecting portion to be clamped between the outer ring and the protruding annular end portion of the piston and thus to frictionally retain the connecting portion on the protruding annular end portion of the piston in use. This expedient, in addition to achieving secure retention of the connecting portion on the piston, also contributes to noise reduction.

Further noise reduction is achieved when, in accordance with a further advantageous aspect of the present invention, the inner region of the deformable portion has a zone which extends over one major surface of the web to acoustically insulate the connecting portion. Additionally, this zone may also thermally insulate the connecting portion.

The sealing element may advantageously be used with a hollow piston having an internal circumferentially extending bead at the protruding annular end portion. Then, it is advantageous when the inner ring of the connecting portion has at least one engaging zone which engages behind the bead of the piston in use to retain the connecting portion on the protruding annular end portion of the piston. The engaging zone may advantageously be constituted by a lug extending outwardly from the inner ring and oppositely to the direction of introduction of the latter into the protruding annular end portion of the piston.

The inner ring of the connecting portion advantageouly conically converges in the direction of introduction thereof into the protruding annular portion of the piston. This is particularly advantageous when the sealing element is used with a retaining clip, especially of a brake shoe; in effect the inner ring thus has a retaining zone remote from the web and also inwardly spaced from the inner surface of the piston which is engaged by the retaining clip in use.

The deformable portion has an intermedite region between said inner and outer regions. This intermediate region may have an undulating configuration in the relaxed condition, or it may have a plurality of weakened zones for preferential formation of undulations upon deformation of the intermediate region.

The sealing element advantageously further comprises a reinforcing ring, especially of a substantially S-shaped configuration in axial section, at least partially embedded in the outer region of the deformable portion.

According to one aspect of the present invention, a brake, particularly in a disc brake, comprises in combination a support; at least one brake shoe mounted on the support for movement along an axis; means for moving the brake shoe, including a cylinder-and-piston unit centered on the axis and having a cylinder mounted on the support and bounding a bore which has an open end facing the brake shoe and a piston partially received in the bore for displacement along the axis and having an annular end portion permanently protruding out of the open end of the bore, and means for connecting the brake shoe to the piston for joint axial displacement relative to the cylinder; and means for preventing environmental contaminants from reaching the interface between the cylinder and the piston, including a sealing element having an annular deformable portion of elastically deformable material having an outer region sealingly engaging the cylinder and an inner region, and an annular connecting portion of resilient material permanently sealingly connected to the inner region of the deformable portion and having a substantially U-shaped configuration in axial section to embrace and clampingly engage the protruding annular end portion of the piston. The connecting portion advantageously includes an inner ring extending into the protruding annular portion of the piston and having a retaining zone internally spaced from the latter, and the connecting means includes a resilent retaining clip affixed to the brake shoe and engaging behind the retaining zone of the inner ring of the connecting portion. In this manner, there is obtained secure connection of the brake shoe, via the retaining clip, to the piston of the cylinder-and-piston unit, without requiring the provision of any internal groove in the piston for this purpose.

BRIEF DESCRIPTION OF THE DRAWING

Above-mentioned and other features and objects of this invention will become more apparent by reference to the following description taken in conjunction with the accompanying drawing, in which:

FIG. 1 is an axial sectional view of a part of a brake shoe and a cylinder-and-piston unit for actuating the same and equipped with a sealing element according to the present invention; and FIG. 2 is a view similar to FIG. 1 but showing only the cylinder-and-piston unit and a modified version of the sealing element.

DETAILED DISCUSSION OF THE PREFERRED EMBODIMENTS

Referring now the the drawing in detail, and first to FIG. 1 thereof, it may be seen that the reference numeral 1 has been used to identify an actuating cylinder-and-piston unit as used in a spot-type disc brake. The cylinder-and-piston unit 1 includes a cylinder or housing 2 which bounds an internal space or bore 3 having an open end 4. The unit 1 further includes a piston 5 which is received in the bore 3 of the cylinder 2 for displacement in the axial direction thereof under the pressure of a hydraulic medium admitted into the bore 3 through a port or nipple 6 from the hydraulic braking system of a vehicle during the braking operation. The illustrated location of the nipple 6 is examplary only and not critical; it will generally be determined by space availability and similar considerations.

The piston 5 is constructed as a hollow piston bounding an internal recess 7 and has an annular end portion 8 which permanently protrudes out of the bore 3 of the cylinder 2. In the retracted position of the piston 5 which is illustrated in FIG. 1 and which is assumed prior to the braking operation, the annular protruding portion 8 of the piston 5 is at least partially received in a recess 9 of the cylinder 2, which has a larger diameter than the bore 3 and is situated adjacent the open end 4 of the bore 3. The cylinder 2 further has an internal groove 10 at its open end 4, this groove receiving a sealing ring 11 whose main purpose is to prevent leakage of the hydraulic medium through the interface between the cylinder 2 and the piston 5 to the exterior of the unit 1.

The cylinder-and-piston unit 1, when used in a disc brake or in a similar environment which is abundant in solid or liquid contaminants, will be exposed to the danger that such contaminants could enter the interface between the cylinder 2 and the piston 5 and interfere with the smooth operation of the unit 1 or even lead to its destruction due to the abrasive and/or corrosive action of such contaminants. To avoid this possibility, the unit 1 is equipped with a sealing element 12, hereafter referred-to as dust boot.

The dust boot 12 of the present invention has an annular configuration and includes an elastically deformable portion 13, preferably of an elastomeric material such as EPDM rubber, and a connecting portion 14 preferably of a resilient material which is permanently secured to the deformable portion 13, especially in that the deformable portion 13 is vulcanized onto the connecting portion 14.

The deformable portion 13 includes an outer region 15 which has a reinforcing ring 16 at least partially embedded therein. The reinforcing ring 16 is of a relatively rigid material, such as metal, and has a substantially L-shaped configuration as considered in axial section. The outer region 15 of the deformable portion 13 is partially received in the recess 9 of the cylinder 2 upon assembly, such that the elastic material of the outer region 15 is squeezed between the reinforcing ring 16 and the surface of the cylinder 2 which bounds the recess 9 and thus securely prevents extraction of the outer region 15 of the deformable portion 13 from the recess 9 of the cylinder and provides sealing action at this interface. The deformable portion 13 also has an inner region 17 and an intermediate region 18 which extends between and interconnects the inner and outer regions 17, 15. Obviously, to prevent the contaminants from reaching the area of interest, all of the regions 15, 17, and 18 or the deformable portion 13 have to be impervious at least to such contaminants. The intermediate portion 18 shown in FIG. 1 in its relaxed position has a bellows-shaped or undulating configuration as considered in axial section. This is achieved in that the deformable portion 13 of the sealing element 12 is molded in an axially split mold having a cavity of correspondingly undulating configuration. Hence, the material of the intermediate portion 18 will be in its relaxed condition in the illustrated retracted position of the piston 5 relative to the cylinder 2.

The connecting portion 14 of the sealing element 12 has an outer ring 19, and inner ring 20, and a web 21 which interconnects the rings 19 and 20 with one another. The outer ring 19 is illustrated in FIG. 1 as being spaced from the external circumferential surface of the protruding portion 8 of the piston 5. However, it is also possible and contemplated to so dimension the outer ring 19 of the connecting portion 14 as to obtain pressure or interference fit between the same and the protruding portion 8 of the piston 5 and thus to obtain or enhance retention of the connecting portion 14 on the protruding portion 8. The outer ring 19 of the connecting portion 14 is connected in the above-mentioned manner to the inner region 17 of the deformable portion 13 such that imperviousness to the contaminants and/or sealing effect is obtained at this zone as well. To obtain this result, especially when vulcanization is used for accomplishing the connection, the inner region 17 and the outer ring 19 partially overlap one another at the exterior of the outer ring 19, as also illustrated in FIG. 1.

The interconnecting web 21 of the connecting portion 14 is shown in FIG. 1 to directly overlie and contact the annular end face of the protruding portion 8 of the piston 5. However, if desired or necessary, for instance, for noise reduction or thermal insulation purposes, a layer of a material of the desired properties may be provided on the inner surface of the web 21 to become interposed between the same and the end surface of the protruding portion 8 of the piston 5 upon assembly of the sealing element 12 with the piston 5. This will be discussed in more detail later.

The inner ring 20 of the connecting portion 14 extends into the interior 7 of the piston 5 in juxtaposition with the protruding portion 8 but at an inward spacing therefrom. Advantageously, and for reasons which will become apparent hereafter, this spacing increases in the inward direction, so that the inner ring 20 has a frusto-conical configuration. The inner ring 20 has a plurality of preferably stamped-out lugs or engaging projections 22 which extend outwardly of and beyond the inner ring 20 and into engagement with the piston 5. As shown, the protruding portion 8 of the piston 5 has an inner bead 23 which is produced during the piston-molding operation and which serves as an ejecting or extracting bead in such operation, and the lugs 22 engage behind this bead 23 upon assembly of the connecting portion 14 with the piston 5. Thus, the lugs 22 prevent undesired extraction of the inner ring 20 from the internal space 7 of the piston 5 and thus retain the connecting portion 14 on the protruding portion 8 even under the most adverse operating conditions, either alone or in combination with the above-mentioned frictional retention due to the pressure or interference fit of the outer ring 19. In order to further improve the retentive capability of the lugs 22, they are so oriented as to extend oppositely to the direction of introduction of the inner ring 20 into the space 7 of the piston 5, so that any forces acting on the connecting portion 14 in the direction of extraction of the inner ring 20 from the space 6 will effectively increase the resistance of the lugs 22 to extraction by causing the same to more firmly engage behind the bead 23 or even to dig into the material of the piston 5. As mentioned before, the bead 23 is not to be especially provided for the purpose of providing a retaining portion for engagement by the lugs 22; rather, it is formed during and for the purposes of the molding operation, and it is only being used as the retaining portion because it is already there. On the other hand, there is no actual reason, in most instances, to provide this bead 23 unless it is needed during the production of the piston 5 merely since it may be needed for the retention of the lugs 22; rather, should this bead be absent, it is still possible to obtain secure retention of the connecting portion 14 on the protruding portion 8 of the piston 5 by letting the lugs 22 dig into the material of the piston 5. For this purpose, the lugs 22 may be provided with or as barbs.

FIG. 1 also shows that a protective portion or member 24 may be provided at the surface of the interconnecting web 21 which faces away from the piston 5. This protective member may be, for instance, of a thermally insulating material to serve as heat shield and, as shown, it may extend outwardly beyond the connecting portion 14 of the sealing element 12 to protect the deformable portion 13 as well. The protective portion 24 may be a different material than or of the same material as the deformable portion 13; in each instance, it may be separated from or form a continuous extension of the overlapping portion of the inner region 17 of the deformable portion 13.

As mentioned before, the cylinder-and-piston unit 1 is currently primarily intended for use in disc brakes of motor vehicles for moving a brake shoe or brake shoes at least into frictional engagement with a rotatable brake disc. A portion of such brake shoe, identified by the reference numeral 25, is also shown in FIG. 1. It includes a preferably metallic backing plate 26, and a friction lining 27 secured thereto. A retention clip 28, which may include several prongs, is secured to the backing plate 26, such as by a rivet 29 or a similar fastener. The retention clip 28 is made of a resilient, preferably metallic, material and it has, or its prongs have, the angled shape or shapes evident from the drawing. Because of this shape, and the resiliency of the material of the clip 28, it or its prongs will be deflected inwardly during the introduction thereof into the inner ring 20 of the sealing element 12 which, at the time of this introduction, may already be mounted on the cylinder-and-piston unit 1. Once properly introduced, the clip 28 or its prongs will expand and usually engage behind the inner ring 20 of the connecting portion 14 of the sealing element 12. In any event, such an engagement will exist whenever forces tending to separate the brake shoe 25 from the piston 5 act on these components. Under such circumstances, the resiliency of the clip 28 or of its prongs will oppose this tendency. The wall thickness and material of the clip 28 is so selected that forces encountered during the operation of the brake will be insufficient to overcome such opposing forces. On the other hand, the clip 28 or its prongs will still be able to move inwardly not only during the assembly of the brake shoe 25 with the piston 5, but also during disassembly thereof, in response to application of forces of sufficient magnitude, such as when it is desired to replace a brake shoe 25 with a worn-out lining 27 by a new one.

FIG. 2 of the drawing shows some additional possibilities of construction and mounting of the sealing element 12 contemplated by the present invention. Inasmuch as the basic construction of the arrangement of FIG. 2 corresponds to that of FIG. 1, the same reference numerals as in FIG. 1 have been used in FIG. 2 to identify the same or corresponding parts.

The piston 5 is shown in FIG. 2 in its fully extended position in which the intermediate region 18 of the deformable portion 13 of the sealing element 12 is stretched. In this stretched position, the deformable portion 13 assumes its relaxed or as-molded condition as opposed to the deformable portion 13 of FIG. 1 which is in its as-molded or relaxed condition when assuming the undulating shape. The deformable portion 13 of FIG. 2 may thus be molded in a substantially radially split mold. To facilitate the folding of the intermediate region 18 during the retraction of the piston 5, a plurality of folding grooves 30 is provided either on one or on both of the major surfaces of the intermediate region 18 for preferential bending at these grooves 30.

The inner region 17 of the deformable portion 13 has a zone 31 which inwardly overlies the outer ring 19 of the connecting portion 14. The thickness of the zone 31 is such that, during the assembly of the sealing element 12 with the piston 5, the material of the zone 31 is elastically compressed between the inner surface of the outer ring 19 of the connecting portion and the outer surface of the protruding portion 8 of the piston 5. In this manner, there is obtained frictional engagement of the zone 31 with the protruding portion 8 sufficient to oppose any tendency of the connecting portion 14 to slide off the protruding portion 8 during the use of the cylinder-and-piston unit 1, if the frictional engagement of the zone 31 with the protruding portion 8 constitutes the only means for holding the connecting portion 14 on the protruding portion 8. Of course, if additional retaining means is provided, such as that discussed above, then it need only be the combined action of such additional retaining means and of the zone 31 which provides for the safe retention of the connecting portion 14 on the protruding portion 8.

In FIG. 2, the piston 5 does not have any internal projection or bead, and the inner ring 20 of the connecting portion 14 is shown not to have any lugs. Under these circumstances, it is only the retentive action of the zone 31 which holds the connecting portion 14 on the protruding portion 8. However, it will be appreciated that, as explained above, even in the absence of the bead, the inner ring 20 of the connecting portion 14 may still have the lugs 22 of FIG. 1, such lugs 22 then digging into the material of the piston 5, especially when the latter is made of a synthetic plastic material.

The zone 31 is shown in FIG. 2 to terminate at the corner between the outer ring 19 and the interconnecting web 21 of the connecting portion 14. However, it will be understood that, should it be desired to, for instance, provide for additional noise abatement or heat-transmission reduction, the zone 31 could extend around the corner and at least partially overlie the surface of the web 21 which faces the end face of the protruding portion 8 of the piston 5 in the assembled condition.

As also illustrated in FIG. 2, the inner region 17 of the deformable portion 13 has an extension 32 which extends around the corner between the outer ring 19 and the web 21 to overlie the surface of the latter which faces away from the piston 5 in the assembled condition. The provision of this zone 32 disposes of the possibly otherwise existing need for providing a separate additional noise-damping shim at this surface. Under some circumstances, it may even be advantageous to embed the entire connecting portion 14 in the inner region 19 of the deformable portion 13.

It will be understood from the above description that the features of the present invention which have been discussed above in connection with the description of FIGS. 1 and 2 may also be used in combination with one another, to the extent that they are not mutually exclusive. Some of such possible combinations have already been alluded to before; additionally, for instance, the configuration of the intermediate region 18 of the deformable portion 13 shown in FIG. 2 may be used in combination with the other features of FIG. 1 and vice versa, and various other combinations are also possible and contemplated by the present invention.

While we have described above the principles of our invention in connection with specific apparatus, it is to be clearly understood that this description is made only by way of example and not as a limitation to the scope of our invention as set forth in the accompanying claims.

We claim:

1. A flexible sealing boot adapted for use as a disc brake dust boot to prevent contaminants from reaching the interface between a cylinder having a central bore with an open end thereof and a piston reciprocable within the bore of said cylinder such that a transverse end face of the piston extends a distance out from the open end of said cylinder bore when said piston is fully retracted into said bore, said piston having an annularly extending open end portion having an internal recess, said cylinder having a recess adjacent the open end of said bore enlarging the open end of said bore, said piston having an annular recess at the end portion thereof forming with the cylinder recess an enlarged common inset open at the cylinder open end, an annular bellows member of elastically deformable material resting within said inset, said bellows member having a plurality of folded bellows when said piston is fully retracted into said bore, an annular rigid reinforcing ring sealing and holding the outer periphery of the bellows member to the cylinder against a wall of said inset, an annular resilient cup shaped member permanently affixed to the bellows member at the inner periphery of the bellows member, said resilient member comprising three integrally connected ring sections, a first of said ring sections permanently affixed to an end section of said bellows member within the piston recess, said first ring having its length generally parallel to the axis of the cylinder bore, the second ring section overlying and contacting the transverse face of the piston, and the third ring section protruding into the open end recess of said piston to grip the annular protruding portion of the piston from the interior thereof, said bellows member including an inner region overlying the second ring of said resilient member with said inner region compressed between the second ring and a brake shoe, and said bellows member is disposed to stretch on sliding movement of said piston in the out of bore direction and cover said interface.

* * * * *